(12) United States Patent
Barbour et al.

(10) Patent No.: US 10,536,436 B1
(45) Date of Patent: Jan. 14, 2020

(54) CLIENT AUTHENTICATION UTILIZING SHARED SECRETS TO ENCRYPT ONE-TIME PASSWORDS

(71) Applicant: Amazon Technologies, Inc., Seattle, WA (US)

(72) Inventors: Marc R. Barbour, Woodinville, WA (US); Ruchith Udayanga Fernando, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 15/192,744

(22) Filed: Jun. 24, 2016

(51) Int. Cl.
*H04L 9/00* (2006.01)
*H04L 29/06* (2006.01)

(52) U.S. Cl.
CPC ........ *H04L 63/0428* (2013.01); *H04L 63/061* (2013.01); *H04L 63/0838* (2013.01)

(58) Field of Classification Search
CPC .................................................. H04L 63/0428
USPC .......................................................... 713/171
See application file for complete search history.

(56) References Cited

U.S. PATENT DOCUMENTS

| | | |
|---|---|---|
| 2011/0026716 A1 | 2/2011 | Tang et al. |
| 2011/0185174 A1 | 7/2011 | Blewett et al. |
| 2013/0179692 A1 | 7/2013 | Tolba et al. |
| 2013/0254875 A1 | 9/2013 | Sama |
| 2014/0365771 A1 | 12/2014 | Sakumoto et al. |
| 2015/0172922 A1 | 6/2015 | An et al. |
| 2017/0134429 A1 | 5/2017 | Gustafsson |
| 2017/0257215 A1 | 9/2017 | Huang et al. |
| 2017/0346815 A1 | 11/2017 | Andrews et al. |

OTHER PUBLICATIONS

Wu, T. "The SRP Authentication and Key Exchange System," Request for Comments: 2945, Standards Track, Sep. 2000, 8 pages.

*Primary Examiner* — Christopher J Brown
(74) *Attorney, Agent, or Firm* — Davis Wright Tremaine LLP

(57) ABSTRACT

A computer-implemented service uses information associated with a client device to generate a first shared secret. The service receives, from the client, a claim of access to a second shared secret and determines whether the first shared secret and the second shared secret match. If the shared secrets match, the service uses the first shared secret to encrypt a one-time password. The service provides the encrypted one-time password to the client device. The client device transmits a claim of access to the one-time password, which the service uses to determine whether the claim of access to the one-time password indicates access to the one-time password. If the claim of access to the one-time password indicates that the client device has access to the one-time password, the service allows the client device to access the service.

20 Claims, 10 Drawing Sheets

CLIENT AUTHENTICATION UTILIZING SHARED SECRETS TO ENCRYPT ONE-TIME PASSWORDS

CROSS REFERENCE TO RELATED APPLICATIONS

This application incorporates by reference for all purposes the full disclosure of co-pending U.S. patent application Ser. No. 15/192,654, filed concurrently herewith, entitled "CLIENT AUTHENTICATION UTILIZING ASYMMETRIC KEYS TO ENCRYPT ONE-TIME PASSWORDS."

BACKGROUND

One-time passwords are often utilized by computing resource services and other services as a form of authentication for users of these services. For instance, as part of an authentication process, a service may transmit to a user of the service a one-time password that is valid for a limited period of time and require the user to provide the one-time password to verify the identity of the user. In some cases, one-time passwords are used as part of a multifactor authentication scheme whereby a user may be required to provide the one-time password and an additional password for authentication. Alternatively, a user may utilize asymmetric cryptographic keys or shared secrets to digitally sign a message that can be used as a credential for the user. However, providing a one-time password seed to users may be fraught with issues. For instance, if a user misplaces or loses the seed, the user may be unable to produce the one-time password necessary for authentication.

BRIEF DESCRIPTION OF THE DRAWINGS

Various techniques will be described with reference to the drawings, in which.

DETAILED DESCRIPTION

Figure 1:
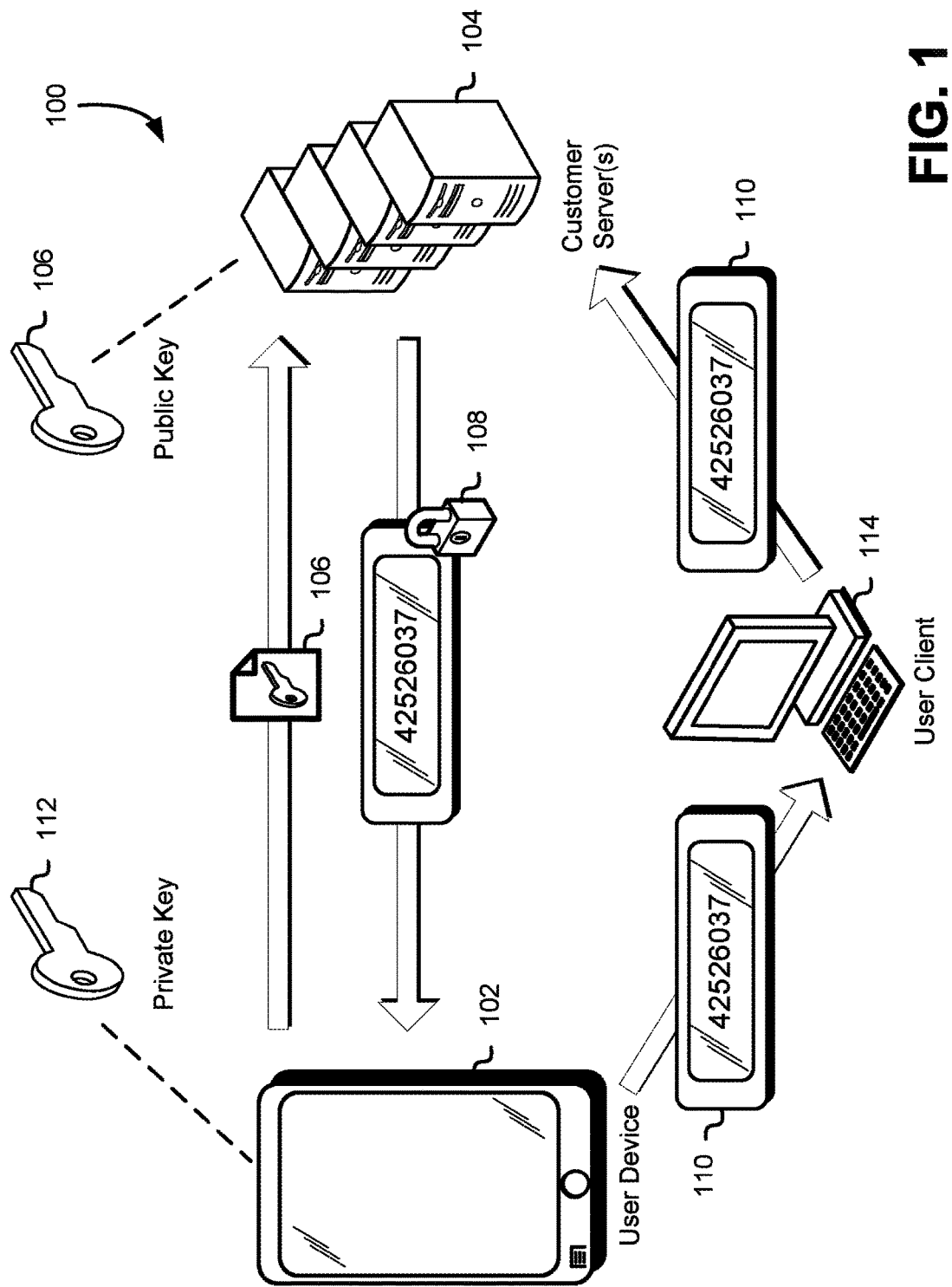
FIG. 1 shows an illustrative example of an environment in which a customer server utilizes a user's public cryptographic key to encrypt a one-time password for a user device in accordance with at least one embodiment.

This disclosure relates to the use of asymmetric cryptography and shared secrets between a user client and a computer-implemented service to enable the use of encrypted one-time passwords generated by the computer-implemented service for authentication of the user client. In an example, a user of a user device associated with a client device generates a cryptographic key pair that includes a private cryptographic key that is maintained by the user device and a public cryptographic key that can be provided to a computer-implemented service to enable that service to encrypt credentials for the user. For instance, in response to receiving a request from the user through the client to access the computer-implemented service, the computer-implemented service may generate a unique one-time password for the user that can be used to authenticate the user. The computer-implemented service may utilize the public cryptographic key provided by the user device to encrypt the one-time password and may transmit the encrypted one-time password to a user device. Additionally, the computer-implemented service may use its own proprietary cryptographic key to encrypt the one-time password to enable the computer-implemented service to verify the one-time password if received from the user client.

In response to receiving the encrypted one-time password from the computer-implemented service, the user device may invoke an application that may evaluate the one-time password and utilize the private cryptographic key to decrypt the one-time password. The user device may provide the decrypted one-time password to the client. The user client may provide the decrypted one-time password, as well as other credentials for the user, to the computer-implemented service for authentication. The computer-implemented service evaluates the decrypted one-time password on the user client against its stored encrypted one-time password to determine whether the one-time passwords match. If the one-time passwords match and the user's other credentials are valid, the computer-implemented service may allow the user, through the user client, to access the computer-implemented service for its own purposes. However, if either the one-time passwords do not match or user's other credentials are not valid, the computer-implemented service may deny the user's request to access the computer-implemented service.

In an alternative example, in response to the user request to access the computer-implemented service, computer-implemented service transmits a message to the user device to invoke an application that may prompt the user to provide user information to the computer-implemented service that can be used to generate a shared secret. In response to receiving the user information from the user device, verification of the information is performed between the user's device and computer-implemented service via a password-authenticated key agreement protocol resulting in a shared secret that is shared between the application on the user's device and the computer-implemented service. In some examples, the computer-implemented service generates a random one-time password for the user and uses the shared secret to encrypt the one-time password. The computer-implemented service may also utilize its proprietary cryptographic key to encrypt the one-time password for verification purposes. The computer-implemented service provides the one-time password encrypted using the shared secret to the user device for use in authentication.

The user device may use the shared secret to decrypt the one-time password. The user device may display the decrypted one-time password to the user. This may allow the user to enter the one-time password into a user interface that the service has provided, along with any other credentials required by the service for authentication. In response to receiving the decrypted one-time password from the user, the computer-implemented service may decrypt the encrypted one-time password that it generated using its proprietary cryptographic key and compare this one-time password to the decrypted one-time password received from the user. If the one-time passwords match, and the other credentials provided by the user are valid, computer-implemented service may authenticate the user and allow the user to proceed. However, if the one-time passwords do not match or any of the other credentials provided by the user are not valid, the computer-implemented service may reject the request from the user.

In this manner, a computer-implemented service can use asymmetric cryptography and shared secrets to encrypt and manage one-time passwords that can be used for authentication of users and user clients. In addition, the techniques described and suggested herein facilitate additional technical advantages. For example, because the computer-implemented service generates the one-time passwords that are used for authentication of the user or the user client, the seed utilized to generate the one-time passwords is not exposed to the user on the user client thereby preventing a malicious user from gaining access to the seed to generate the one-time password. Further, because the user provides its public cryptographic key to the service for encryption of the one-time password, only an entity that has access to the private cryptographic key will be able to decrypt the one-time password provided by the service. Similarly, if there is a shared secret shared between the user and the service, only an entity having access to that shared secret may be able to decrypt the one-time password obtained from the service. Thus, these processes may add an additional layer of security between users of the computer-implemented service and computer-implemented service itself.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which a customer server 104 utilizes a user's public cryptographic key 106 to encrypt a one-time password 110 for a user device 102 in accordance with at least one embodiment. In the environment 100, a user utilizes its user client 114 to navigate the user client 114 to a user interface of a computer-implemented service. This user interface may be provided to the user client 114 through one or more customer servers 104 that are used to maintain the computer-implemented service. A user client 114 can include any appropriate device operable to send and/or receive requests, messages, or information over an appropriate communications network and, in some embodiments, convey information back to a user of the user client 114. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof.

In response to a communication received from the user client 114, a customer server 104 may generate a user interface that may be used by the user of the user client 114 to interact computer-implemented service. The computer-implemented service may cause the user client 114 to display the user interface. Through the user interface, the computer-implemented service may prompt the user to provide a username associated with the computer-implemented service. For instance, as part of a registration process with the computer-implemented service, the user may be required to provide a unique username can be used to identify the user within the computer-implemented service environment. The user may utilize the user client 114 to provide its username to the computer-implemented service. The one or more customer servers 104 may receive the username from the user client 114 and identify a user profile for the user. Additionally, the computer-implemented service may update the user interface to prompt the user to provide a one-time password that is provided by the one or more customer servers 104. While usernames are used extensively throughout the present disclosure, the one or more customer servers 104 may utilize other techniques to identify the user of the user client 114. For instance, the user client 114 may transmit, to the one or more customer servers 104, a cookie that includes user information that may be used to identify the user. Alternatively, the one or more customer servers 104 may utilize an Internet Protocol (IP) address of the user client 114 to identify the user attempting to access the computer-implemented service.

In an embodiment, as part of the registration process, a user of the computer-implemented service is required to provide a public cryptographic key 106 that can be used by the one or more customer servers 104 to encrypt a one-time password 110 that is to be provided to the user for authentication. Through a user device 102 (e.g., smartphone, laptop computer, Internet of Things (IoT) device, other computing device, etc.), the user may generate a cryptographic key pair that includes the public cryptographic key 106 and a corresponding private cryptographic key 112. The user may maintain the private cryptographic key 112 for decryption of any data provided by the one or more customer servers 104 that has been encrypted using the user's public cryptographic key 106. The computer-implemented service, through the one or more customer servers 104, may store the public cryptographic key 106 for the user and obtain the public cryptographic key 106 from storage in response to a request from the user client 114 to access the computer-implemented service.

The one or more customer servers 104 of the computer-implemented service generate, in response to the user request for access to the computer-implemented service, a random one-time password that may be used for authentication purposes. In an embodiment, the one or more customer servers 104 utilize a proprietary cryptographic key to encrypt the random one-time password. While proprietary cryptographic keys are used extensively throughout the present disclosure for the purpose of illustration, other methods may be used to encrypt the one-time password 110. For example, the one or more customer servers 104 may use a block cipher, a stream cipher, a cryptographic hash function, steganography, or any combination thereof to encrypt the one-time password 110. The one or more customer servers 104 may store this encrypted one-time password within the database along with the proprietary cryptographic key used to encrypt the one-time password 110. This encrypted one-time password can be used for verification purposes as described below.

Additionally, the one or more customer servers 104 may use the user's public cryptographic key 106 to encrypt the one-time password 110, generating the encrypted one-time password 108. The one or more customer servers 104 may transmit a message to the user device 102 to provide the encrypted one-time password 108. In response to receiving the message from the one or more customer servers 104, the user device 102 may invoke an application that can decrypt the encrypted one-time password 108. The message from the one or more customer servers 104 may be transmitted to the user device 102 using a short message service (SMS) message, a push notification, or other text messaging formats. Alternatively, the message may be provided to the user device 102 via electronic mail, notification services, or any other method for transmitting notifications to a user device 102.

The application invoked in response to receipt of the message may obtain from the user device 102 the private cryptographic key 112 generated by the user device 102 as part of the registration process for the computer-implemented service. Using the private cryptographic key 112, the application decrypts the encrypted one-time password 108 from the one or more customer servers 104 to obtain the one-time password 110. If the application is able to successfully decrypt the one-time password 110, the application may cause the user device 102 to display the one-time password 110 for the user. The user may obtain the one-time password 110 from the user device 102 and, through the user client 114, may input the one-time password 110 into the user interface (UI) provided by the computer-implemented service. This may cause the user client 114 to transmit the one-time password 110 to the one or more customer servers 104 for authentication. Additionally, through the UI, the user may provide additional credentials required by the one or more customer servers 104 to authenticate the user. In some embodiments, the user device 102 transmits the decrypted one-time password 110 directly to the user client 114, which causes the user client 114 to transmit the decrypted one-time password 110 to the one or more customer servers 104 without requiring user input. Alternatively, the user device 102 may transmit the decrypted one-time password 110 to the one or more customer servers 104, which may cause the one or more customer servers 104 to update the UI provided to the user client 114 to indicate that the one-time password 110 has been received. In some instances, the user device 102 may utilize Near Field Communication (NFC) protocols, Bluetooth, Universal Serial Bus (USB) connections, or other wired and wireless communications with the user client 114 to provide the decrypted one-time password 110 to the user client 114.

In an embodiment, the user client 114 transmits a claim of access to the decrypted one-time password 110 to the one or more customer servers 104 for authentication. The claim of access to the decrypted one-time password 110 may include information that can be used as evidence of access to the decrypted one-time password 110. For example, the claim of access to the decrypted one-time password 110 may include the decrypted one-time password 110 itself, a value derived based at least in part on the decrypted one-time password 110 that may be used by the one or customer servers 104 to identify the decrypted one-time password 110 (e.g., a hash of the decrypted one-time password 110) or any other data that may be computationally difficult to produce without having access to the one-time password 110.

In response to receiving the one-time password 110 and the other credentials for the user from the user client 114, the one or more customer servers 104 may obtain the encrypted one-time password from its database and any other information from the user's profile that may be used to authenticate the user. For example, the one or more customer servers 104 may use its proprietary cryptographic key to decrypt its own encrypted one-time password. The one or more customer servers 104 may compare this decrypted one-time password to the one-time password 110 obtained from the user. If these one-time passwords match and the other provided credentials are valid, the one or more customer servers 104 determine that the user can be authenticated. However, if the one-time passwords do not match or any of the provided credentials are not valid, the one or more customer servers 104 may deny the user's request to access the computer-implemented service.

In an embodiment, the private cryptographic key 112 generated by the user device 102 is shared with one or more administrator clients to enable these administrator clients to utilize the private cryptographic key 112 to decrypt the one-time password on behalf of the user device 102. For example, if a user of the user client 114 does not have access to a password or other credential necessary to access the computer-implemented service, the user, through the user client 114, can indicate that it would like to either retrieve the existing credential or to generate a new credential. In response to such request, the one or more customer servers 104 may send the encrypted one-time password 108 to an administrator client designated to assist in the credential retrieval or replacement process. The administrator client, rather than the user client 114, may use the private cryptographic key 112 to decrypt the one-time password 110. The administrator client may provide the decrypted one-time password 110 to the user client 114 as part of the credential retrieval or replacement process. Thus, the user client 114 may not have access to the encrypted one-time password 108 from the one or more customer servers 104 and may rather obtain the one-time password 110 from an administrator client if the administrator client determines that the user of the user client 114 is authorized to retrieve or replace an existing credential.

Figure 2:
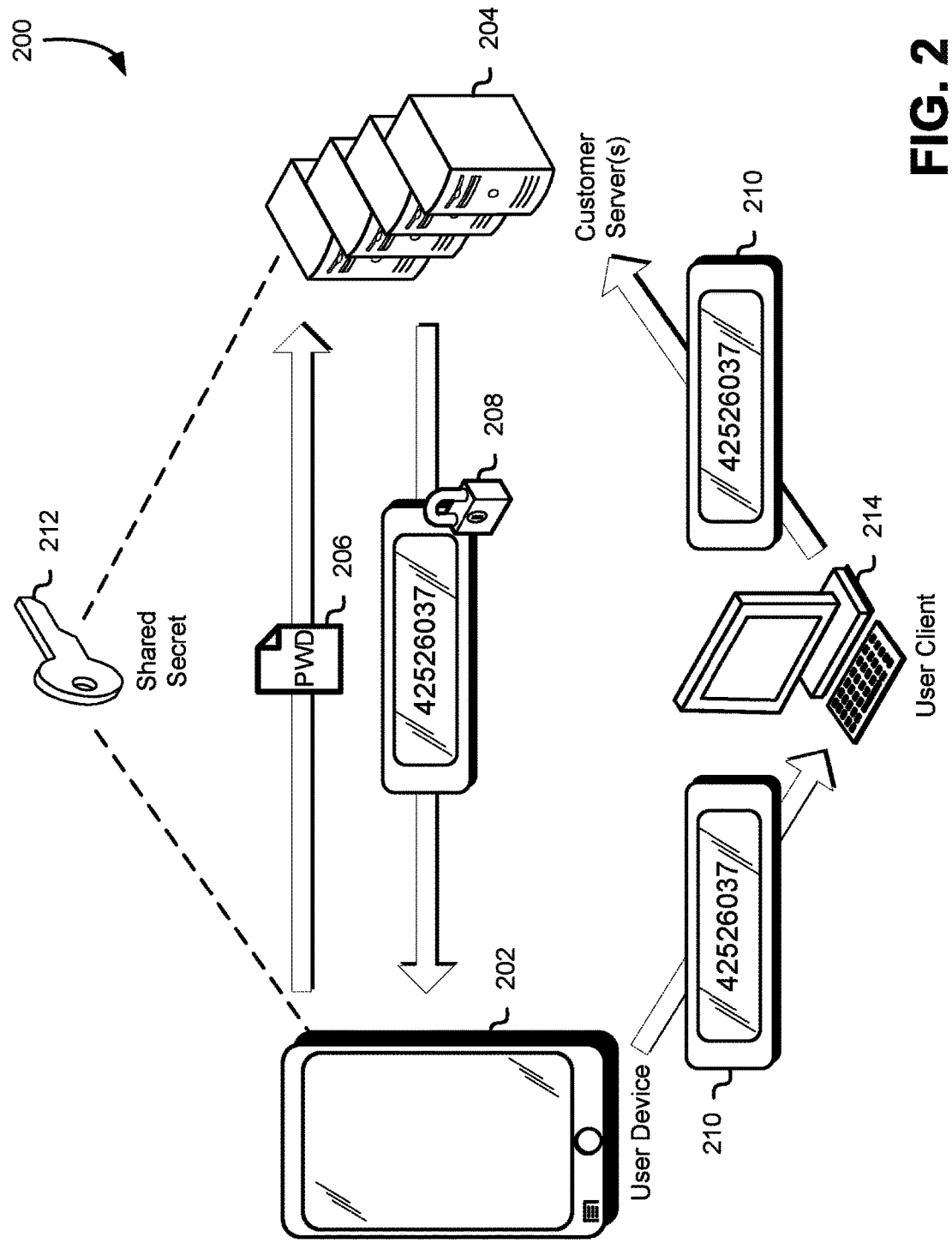
FIG. 2 shows an illustrative example of an environment in which a customer server utilizes a shared secret between the server and a user device to encrypt a one-time password for the user device in accordance with at least one embodiment.

In some embodiments, rather than relying on cryptographic keys to provide the one-time password to a user device for authentication, the one or more customer servers can use a shared secret between the user device and the one or more customer servers to encrypt the one-time password provided to the user client. Accordingly, FIG. 2 shows an illustrative example of an environment 200 in which a customer server 204 utilizes a shared secret 212 between the customer server 204 and the user device 202 to encrypt a one-time password 210 for the user device 202 in accordance with at least one embodiment. In the environment 200, a user device 202 may utilize a Password Authenticated Key Exchange (PAKE) protocol, such as the Secure Remote Password (SRP) protocol described in RFC 2945 and hereby incorporated by reference, to establish a shared secret 212 between the user device 202 and the computer-implemented service through the one or more customer servers 204.

To utilize a PAKE protocol, the user of the user device 202 may select a password or other credential that may be used to generate information 206 associated with the user that can be used to generate a shared secret. The information 206 can be sent to the one or more customer servers 204. This information 206 is not the equivalent to the password generated by the user of the user client 214 and thus cannot be used for authentication of the user. In addition to the information 206 that can be used to generate the shared secret, the user device 202 may provide a salt to the one or more customer servers 204. This salt can be used to negotiate a shared secret 212 between the user device 202 and the one or more customer servers 204. Using information from the user device 202 and information from the one or more customer servers 204 exchanged between the user device 202 and the one or more customer servers 204, the user device 202 and the one or more customer servers 204 may generate a shared secret 212.

To prove that the user device 202 has the same shared secret 212 as the one or more customer servers 204, the user device 202 may hash the shared secret 212 together with other values known by the one or more customer servers 204. The user device 202 provides this hash to the one or more customer servers 204 for verification. In response, the one or more customer servers 204 may calculate its own hash from the same values and the shared secret 212 that they derived. If these hashes match, the one or more customer servers 204 may determine that the user device 202 has access to the correct password or credential and, thus, the user device 202 maintains the same shared secret 212 as the one or more customer servers 204. If the one or more customer servers 204 are unable to determine that the user device 202 has the same shared secret 212 as the one or more customer servers 204, the one or more customer servers may deny the user device 202 request to register the user or to allow the user to access the computer-implemented service.

If the user device 202 and the one or more customer servers 204 have the same shared secret 212, the user device 202 may access the computer-implemented service using the PAKE protocol. For instance, similar to the one or more customer servers 104 described above in connection with FIG. 1, the one or more customer servers 204 provide a UI of the computer-implemented service to the user client 214. Through the UI, the user of the user client 214 may provide its username. This may cause the one or more customer servers 204 to identify a user profile for the user and update the UI to request that the user provide a one-time password 210 provided by the one or more customer servers 204. Additionally, the one or more customer servers 204 may transmit a message to a designated user device 202 that, in response to receiving the message, may invoke an application installed on the user device 202. This application may request that the user provide a password or other credential. This password or other credential may be used to perform password verification between the user device 202 and the one or more customer servers 204, which may result in a shared secret 212 between the application and the one or more customer servers 204.

Additionally, the one or more customer servers 204 may create a random one-time password that may be used for authentication of the user. The one or more customer servers 204 may utilize their own cryptographic key or other encryption method to encrypt the one-time password, which the one or more customer servers 204 may store within a database maintained by the one or more customer servers 204. In an embodiment, the one or more customer servers 204 also utilize the shared secret 212 between the application and the one or more customer servers 204 to encrypt the same one-time password that was generated to create encrypted one-time password 208. The one or more customer servers 204 may transmit the encrypted one-time password 208 to the application on the user device 202.

In response to receiving the encrypted one-time password 208 from the one or more customer servers 204, the application on the user device 202 may utilize the shared secret 212 to decrypt the one-time password 210. The application on the user device 202 may cause the user device 202 to display the decrypted one-time password 210 to the user. The user may enter the one-time password 210 displayed on the user device 202 into the UI of the computer-implemented service as presented through the user client 214. Alternatively, the user, through the user client 214, may provide the one or more customer servers 204 with a claim of access to the one-time password 210, similar to the claim of access described above in connection with FIG. 1. In response to receiving the one-time password 210 from the user, the one or more customer servers 204 may obtain its encrypted one-time password from the database and utilize its own cryptographic key or other decryption method to decrypt its one-time password. If the one-time password 210 from the user matches the one-time password from the database, the one or more customer servers 204 may authenticate the user and allow the user to access the computer-implemented service through the user client 214. However, if there is no match, the one or more customer servers 204 may deny the user's request to access the service.

In an embodiment, the shared secret 212 may also be shared with one or more administrator clients or administrator devices to enable an administrator to use the shared secret 212 to decrypt the one-time password 210 from the one or more customer servers 204. For example, if a user of the user client 214 does not have access to a password or other credential necessary to access the computer-implemented service, the user, through the user client 214, can indicate that it would like to either retrieve the existing credential or to generate a new credential. In response to such request, the one or more customer servers 204 may send the encrypted one-time password 208 to an administrator client designated to assist in the credential retrieval or replacement process. The administrator client, rather than the user device 202, may use the shared secret 212 to decrypt the one-time password 210. The administrator client may provide the decrypted one-time password 210 to the user client 214 as part of the credential retrieval or replacement process. Thus, the user client 214 may not have access to the encrypted one-time password 208 from the one or more customer servers 204 and may rather obtain the one-time password 210 from an administrator client if the administrator client determines that the user of the user client 214 is authorized to retrieve or replace an existing credential.

Figure 3:
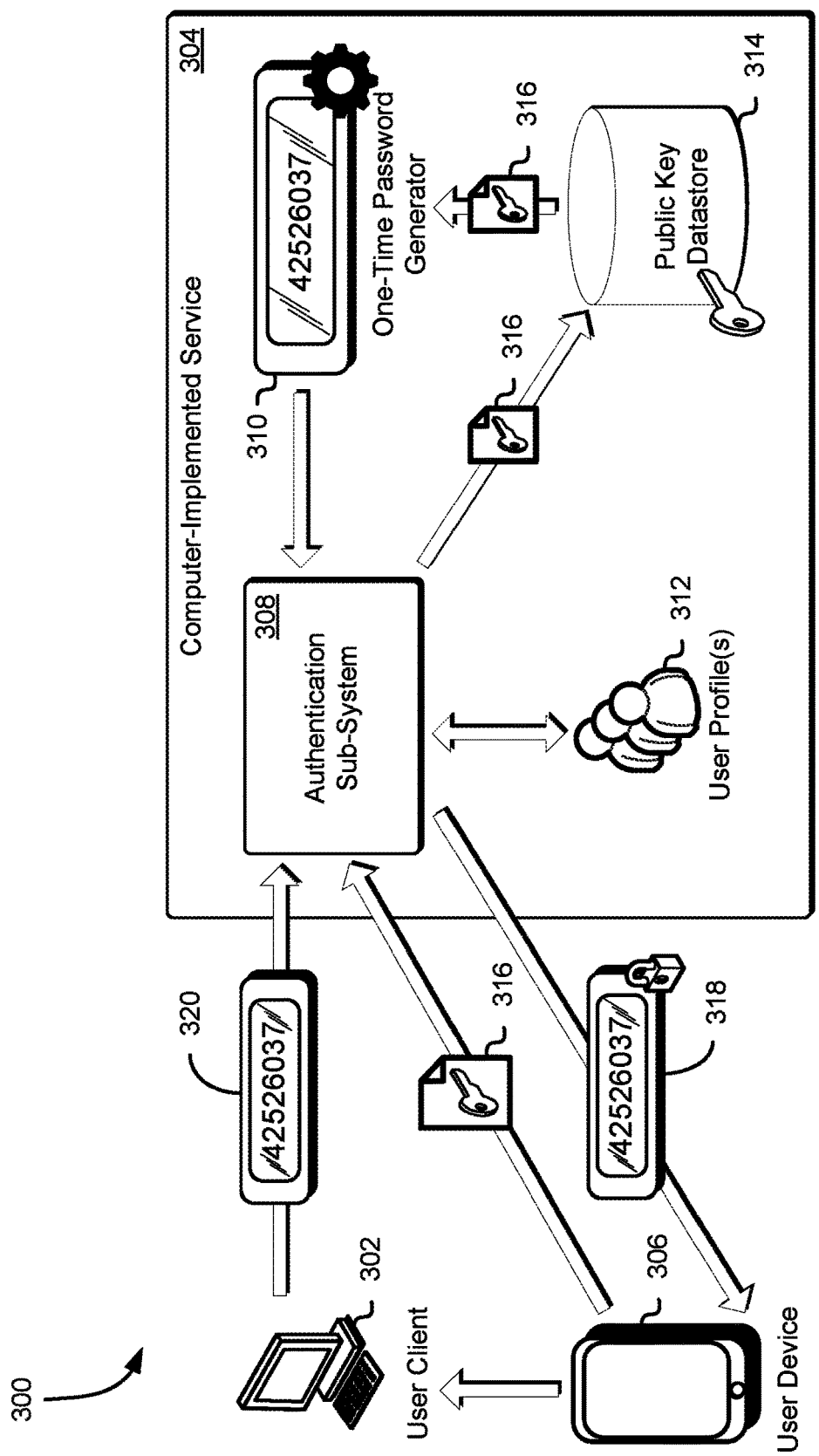
FIG. 3 shows an illustrative example of an environment in which a computer-implemented service generates a one-time password for a user using the user's public cryptographic key to enable authentication of the user in accordance with at least one embodiment.

As noted above, a computer-implemented service may utilize a user's public cryptographic key to encrypt a one-time password that may be provided to the user as part of an authentication scheme. The user may utilize its own private cryptographic key to decrypt the one-time password from the computer-implemented service and utilize the one-time password for authentication. Accordingly, FIG. 3 shows an illustrative example of an environment 300 in which a computer-implemented service 304 generates a one-time password 318 for a user using the user's public cryptographic key 316 to enable authentication of the user in accordance with at least one embodiment. In the environment 300, a user of the user client 302 navigates the user client 302 to a UI of the computer-implemented service 304 to request access to one or more resources of the computer-implemented service 304. In response to the request, the authentication sub-system 308 of the computer-implemented service 304 may update the UI to prompt the user to provide its username. In response to receiving the username for the user through the user client 302, the authentication sub-system 308 may utilize the username to identify a user profile from a user profile repository 312. The user profile repository 312 may include, for each user, a profile that specifies information about the user (e.g., contact information, addresses, associated resources, etc.).

In an embodiment, as part of the user registration process, the authentication sub-system 308 receives a public cryptographic key 316 from a user device 306 that corresponds to a cryptographic key pair generated by the user device 306. The authentication sub-system 308 may store the public cryptographic key 316 for the user within a public key datastore 314. The public key datastore 314 may include a database that matches usernames the corresponding public cryptographic keys for users associated with these usernames. The user device 306 may retain the private cryptographic key of the cryptographic key pair to decrypt any data from the computer-implemented service 304 that has been encrypted using the corresponding public cryptographic key 316.

In addition to obtaining the user profile for the user, the application sub-system 308 may use information from the user profile to identify the public cryptographic key 316 for the user. For instance, authentication sub-system 308 may utilize the database of the public key datastore 314 to look up the public cryptographic key 316 that corresponds to the username provided by the user client 302 or to other information specified in the user profile. In some embodiments, the authentication sub-system 308 updates the UI presented to the user client 302 to prompt the user to provide a one-time password 320 provided by the computer-implemented service. The authentication sub-system 308 may utilize a one-time password generator 310, which may include one or more computer systems that utilize one or more algorithms or seeds to generate a random one-time password for the user. The one-time password generator 310 may obtain, from the public key datastore 314, the public cryptographic key 316 for the user and utilize the public cryptographic key 316 to encrypt the random one-time password 320, generating an encrypted one-time password 318. The one-time password generator 310 may provide the encrypted one-time password 318 to the authentication sub-system 308. In an embodiment, the one-time password generator 310 also utilizes its own cryptographic key or other encryption method to encrypt the random one-time password to generate an encrypted one-time password that can be used for reference and verification. This encrypted one-time password may be stored within the user profile or in some other database where the user may not be able to access this encrypted one-time password.

The authentication sub-system 308 may transmit the encrypted one-time password 318 to the user device 306, which may have installed an application that may be used to decrypt the encrypted one-time password 318. The encrypted one-time password 318 may be provided to the device 306 via an SMS message. In response to receiving the message from the computer-implemented service 304, the device 306 may invoke the application installed on the device 306 that can decrypt the encrypted one-time password 318. Alternatively, the user of the device 306 may receive a notification that the message has been received. In response, the user of the device 306 may use the device 306 to invoke the application. The device 306 may include the private cryptographic key corresponding to the public cryptographic key 316 used to encrypt the one-time password. As described above, the cryptographic key pair may be generated by the device 306 as part of the registration process for the user. The device 306 in such instances may provide the public cryptographic key to the computer-implemented service 304 as part of the registration process for the user.

The application on the device 306 may use the private cryptographic key to decrypt the encrypted one-time password 318 to obtain the one-time password 320. The application may cause the device 306 to display the one-time password 320 for the user. In some embodiments, the device 306 transmits the one-time password 320 to the user client 302, which may then provide the one-time password 320 to the computer-implemented service 304 for authentication. If the device 306 displays a one-time password 320, the user may enter the one-time password 320 into the UI prompt presented on the user client 302 and submit the one-time password, along with any other credentials necessary to authenticate the user, to the computer-implemented service 304.

The authentication sub-system 308 may transmit a request to the one-time password generator 310 to obtain the one-time password stored within the user profile or within another database for verification purposes. The one-time password generator 310 may obtain from the user profile or from the other database the encrypted one-time password stored for verification purposes and utilize its own cryptographic key or other decryption method to decrypt the one-time password. The one-time password generator 310 may provide this one-time password to the authentication sub-system 308 for verification. The authentication sub-system 308 may compare the one-time password 320 from the user client 302 and the one-time password from the one-time password generator 310 to determine if they match. If the one-time passwords match, and the other credentials provided by the user client 302 are valid, the authentication sub-system 308 may determine that the user is authenticated and may allow the user, through the user client 302, to access the computer-implemented service 304. However, if the one-time passwords do not match, or the other credentials provided by the user client 302 are not valid, the authentication sub-system 308 may deny the user's request to access the computer-implemented service 304.

Figure 4:
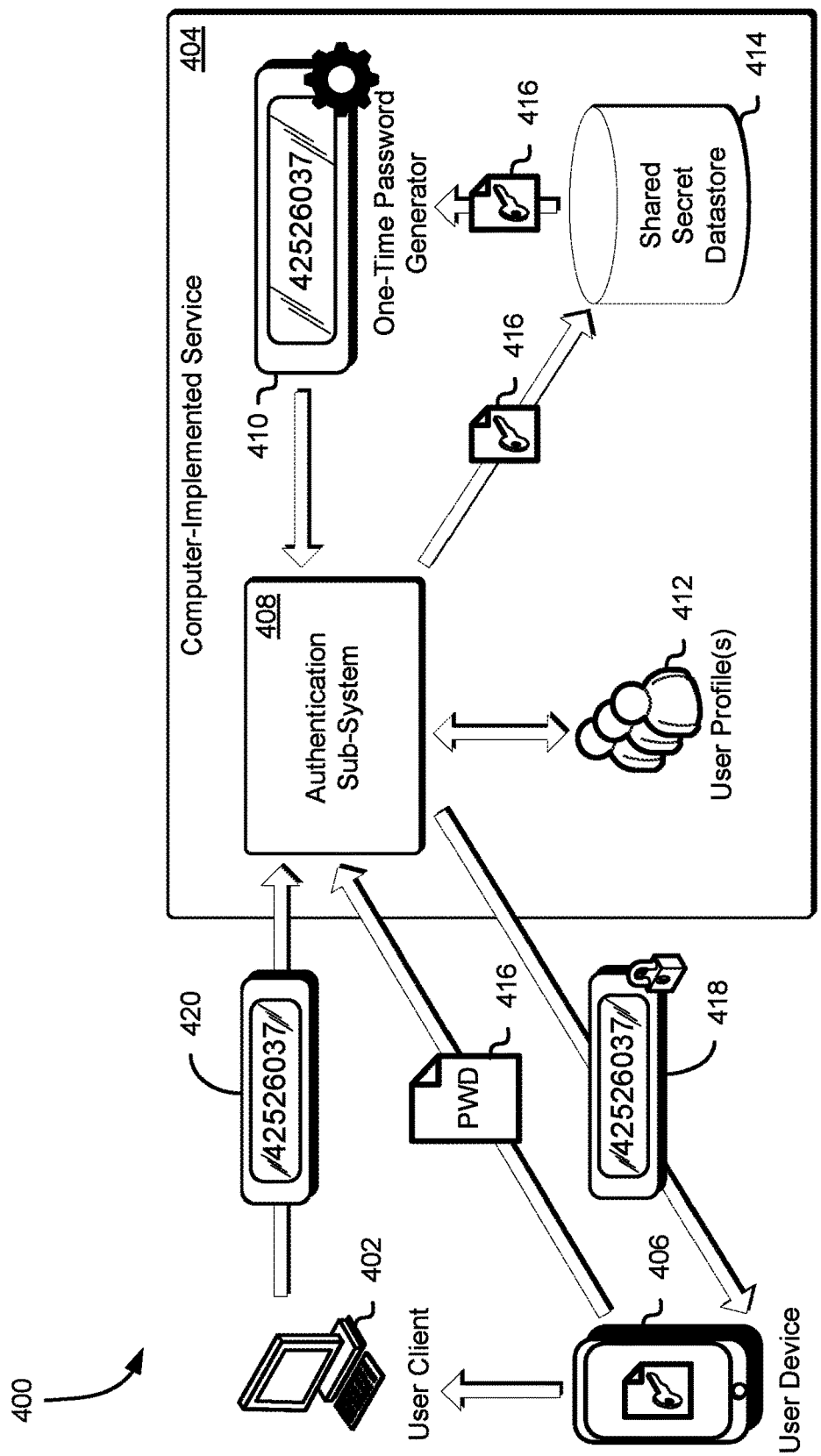
FIG. 4 shows an illustrative example of an environment in which a computer-implemented service generates a one-time password for a user using a shared secret known to the computer-implemented service and the user to enable authentication of the user in accordance with at least one embodiment.
Figure 5:
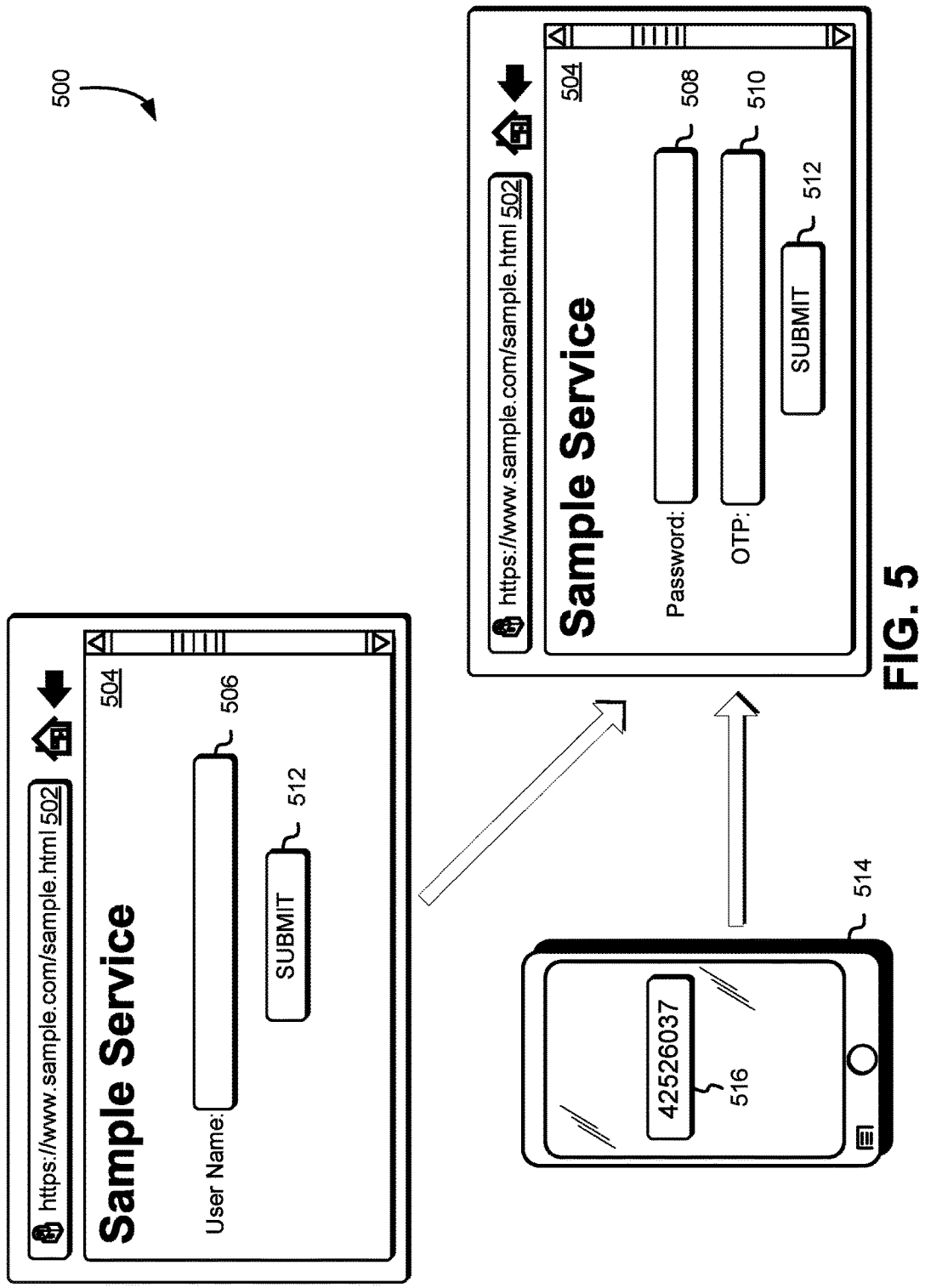
FIG. 5 shows an illustrative example of an environment in which a user utilizes a one-time password decrypted by a user device and other credentials to access a computer-implemented service in accordance with at least one embodiment.

As noted above, a computer-implemented service may utilize a shared secret between the computer-implemented service and a user to encrypt a one-time password that is sent to the user for authentication purposes. The shared secret may be created using a PAKE protocol such as SRP. Accordingly, FIG. 4 shows an illustrative example of an environment 400 in which a computer-implemented service 404 generates a one-time password for a user using a shared secret 416 known to the computer-implemented service 404 and the user to enable authentication of the user in accordance with at least one embodiment. In the environment 400, a user navigates the user client 402 to a UI of the computer-implemented service 404 to request access to one or more resources of the computer-implemented service 404. Similar to the authentication sub-system 308 described above, the authentication sub-system 408 of the computer-implemented service 404 may update the UI to prompt the user to provide its username. In response to receiving the username for the user through the user client 402, the authentication sub-system 408 may utilize the username to identify a user profile from a user profile repository 412.

The authentication sub-system 408, in response to receiving the username user, may update the UI to allow the user, through the user client 402, to provide a one-time password 420 that may be provided by the computer-implemented service 404 for authentication. Additionally, the authentication sub-system 408 may transmit a message to a user device 406 designated by the user in the user profile. This message may allow the invocation of an application on the user device 406 that enables communication between the user device 406 and computer-implemented service 404 using a PAKE protocol such as SRP. The application may prompt the user to provide its password for accessing the computer-implemented service 404. Using the password, the application may provide information associated with a user that can be used to generate a shared secret to the computer-implemented service 404 to enable creation of a shared secret between the application and computer-implemented service 404. For instance, the application may use a mathematical algorithm or hash function on the provided password and provide the output to the computer-implemented service 404. In response to receiving this output, the computer-implemented service 404 may utilize a password verifier (e.g., information against which the output may compared or otherwise checked) to determine whether the received output corresponds to the password of the user. If so, the computer-implemented service 404 determines that the application has access to the user's password and will generate the shared secret.

Using information from the user device 406 and information from the authentication sub-system 408 of the computer-implemented service 404 exchanged between the application and the authentication sub-system 408, the application and the authentication sub-system 408 may generate a shared secret 416. To prove that the application has the same shared secret as the computer-implemented service 404, the application may hash the shared secret together with other values known by the authentication sub-system 408. The application provides this hash to the authentication sub-system 408 for verification. In response, the authentication sub-system 408 may calculate its own hash from the same values and the shared secret 416 that it derived. If these hashes match, the authentication sub-system 408 may determine that the application has access to the correct password or credential and, thus, the application maintains the same shared secret 416 as the authentication sub-system 408. The authentication sub-system 408 may store the shared secret 416 within a shared secret datastore 414 which may include a database that may be used to associate a shared secret 416 with the provided username or with other characteristics of the user as specified in the user profile.

The authentication sub-system 408 may transmit a request to the one-time password generator 410 to generate a random one-time password for the user. In response to the request, the one-time password generator 410 may obtain the shared secret 416 of the user and utilize the shared secret 416 to encrypt the one-time password, resulting in the encrypted one-time password 418. Additionally, the one-time password generator 410 may use its own cryptographic key or other encryption method to encrypt the random one-time password. This second encrypted one-time password may be stored within the user profile for the user or in the database that can be used to associate the second encrypted one-time password with the user. The second encrypted one-time password is stored in a manner that prevents the user from accessing the second encrypted one-time password. The one-time password generator 410 may provide the encrypted one-time password 418 to the authentication sub-system 408 to fulfill the request.

The authentication sub-system 408 may transmit the encrypted one-time password 418 to the application on the user device 406. The application on the user's device 406 may use the shared secret 416 to decrypt the one-time password and, in some instances, display the one-time password 420. The user of the user device 406 may enter the one-time password 420 displayed on the user device 406 into the UI provided by the computer-implemented service 404. In some embodiments, the application transmits the decrypted one-time password 420 to the authentication sub-system 408 directly without displaying the one-time password to the user. Thus, the authentication sub-system 408 may update the UI to indicate that it has received the decrypted one-time password 420 from the application.

In response to receiving the decrypted one-time password 420 from the user client 402 or from the application on the user device 406, the authentication sub-system 408 may determine whether the decrypted one-time password 420 is valid. For example, the authentication sub-system 408 may transmit a request to the one-time password generator 410 to obtain the second encrypted one-time password from the user profile or from the database. The one-time password generator 410 may obtain the second encrypted one-time password and may utilize its own cryptographic key or other decryption method to decrypt the second encrypted one-time password. The one-time password generator 410 may provide the second one-time password to the authentication sub-system 408 to fulfill the request. The authentication sub-system 408 may compare the one-time passwords to determine whether they match. If the one-time passwords match, the authentication sub-system 408 may authenticate the user and enable the user to access the computer-implemented service 404 subject to the validation of any other credentials provided by the user. Alternatively, if the one-time passwords do not match or any other provided credential is not valid, the authentication sub-system 408 may deny the user's request to access the computer-implemented service 404. In some embodiments, the one-time password 420 may only be valid for a limited period of time. Thus, if the application provides the one-time password after the one-time password has expired, the authentication sub-system 408 may determine that the one-time password 420 is not valid and may deny the user's request.

As noted above, the computer-implemented service may provide user clients and other user devices with a UI that a user may use to provide their username, credentials, and a one-time password provided by the computer-implemented service in encrypted form using the user's public cryptographic key or shared secret. Accordingly, shows an illustrative example of an environment 500 in which a user utilizes a one-time password decrypted by a user device and other credentials to access a computer-implemented service in accordance with at least one embodiment. In the environment 500, a user of a user client may invoke an application, such as a web browser, to access a UI 504 of a computer-implemented service. For example, through an address bar 502 of the application, the user may provide a Uniform Resource Identifier (URI) for the computer-implemented service. The application may use the URI provided by the user to access the UI 504 of the computer-implemented service through a communications network, such as the Internet.

Through the UI 504, the computer-implemented service may prompt the user to provide a username that may represent the user within the computer-implemented service. For example, the computer-implemented service may update the UI 504 to include a username input field 506 through which the user may provide its username. Additionally, the computer-implemented service may provide the user with a submit button 512 that the user may use to submit the username provided in the username input field 506. In response to receiving the username from the user through the UI 504, the computer-implemented service may update the UI 504 to prompt the user to provide one or more credentials that may be used to authenticate the user, as well as a one-time password 516 provided by the computer-implemented service to an application installed on a user's device 514. For example, the computer-implemented service may update the UI 504 to include a credential input field 508 and the one-time password input field 510 through which the user may provide its one or more credentials and provided one-time password, respectively.

In an embodiment, the computer-implemented service generates a one-time password for the user that is encrypted using the user's public cryptographic key or a shared secret that is shared between the user and the computer-implemented service. For example, as part of the user registration process, a user may be required to provide a public cryptographic key that may be used by the computer-implemented service to encrypt one-time passwords for the user. The user, through a user device 514, may generate a cryptographic key pair. The user may provide the public cryptographic key of this cryptographic key pair to the computer-implemented service. The user may retain the private cryptographic key, which it may use to decrypt any data provided by the computer-implemented service encrypted using the user's public cryptographic key. The private cryptographic key may be maintained within the user client or within the user's device 514, which may use an application to receive messages from the computer-implemented service.

The computer-implemented service may generate a one-time password 516 for the user and may use the user's public cryptographic key to encrypt the one-time password for delivery to the user device 514. The computer-implemented service may also use its own cryptographic key or other encryption method to encrypt the one-time password 516 to create a second encrypted one-time password that may be used for verification purposes. This second encrypted one-time password is not shared with the user. Instead, the second encrypted one-time password is stored by the computer-implemented service within a database that is only accessible by the computer-implemented service. In response to receiving the encrypted one-time password from the computer-implemented service, the user device 514 may use the user's private cryptographic key to decrypt the encrypted one-time password to obtain the one-time password 516. The user device 514 may display the one-time password 516 through one or more display elements of the user device 514 to enable the user to read the one-time password 516 and enter the one-time password 516 into the one-time password input field 510 of the UI 504. In some embodiments, the user device 514 transmits the one-time password 516 to the computer-implemented service directly. Thus, the computer-implemented service may update the one-time password input field 510 to include the one-time password 516 or an indication that the one-time password 516 has been received.

If the user has provided the one or more credentials through the credential input field 508 and the one-time password 516 through the one-time password input field 510, the user may select the submit button 512 to provide the one or more credentials and the one-time password 516 to the computer-implemented service for authentication. The computer-implemented service may access the user profile for the user to determine whether the one or more credentials are valid. Further, the computer-implemented service may decrypt the second encrypted one-time password stored within the database and compare this one-time password to the one-time password 516 provided by the user through the user client or through the user's device 514. If the provided one or more credentials are valid and the one-time passwords match, the computer-implemented service may authenticate the user and enable the user to access the computer-implemented service. However, if any of the one or more credentials are not valid or the one-time passwords do not match, the computer-implemented service may deny the request from the user to access the computer-implemented service.

In an alternative embodiment, the user device 514, through an application installed on the user device 514, and the computer-implemented service maintain a shared secret generated as a result of a password verification process for the user. For example, the application may prompt the user to provide its password for accessing the service. Using the password, the application may generate information associated with the user that can be used to generate a shared secret, which may be provided to the computer-implemented service, along with a salt can be used negotiate a shared secret between the application and computer-implemented service. The application may use information from the user client and the application and information from the computer-implemented service exchanged between the application and the computer-implemented service to generate a shared secret. To prove that the application has the same shared secret as the computer-implemented service, the application may hash the shared secret together with other values known by the computer-implemented service. The application provides this hash to the computer-implemented service for verification. In response, the computer-implemented service may calculate its own hash from the same values and the shared secret that it derived using the information associated with the user. If these hashes match, the computer-implemented service may determine that the application has access to the correct password or credential and, thus, the application maintains the same shared secret as the computer-implemented service.

The computer-implemented service may generate a one-time password for the user may use the shared secret to encrypt the one-time password 516. Additionally, the computer-implemented service may utilize its own cryptographic key or other encryption method to encrypt the one-time password, resulting in a second encrypted one-time password. The second encrypted one-time password is stored by the computer-implemented service within a database or user profile that is inaccessible to the user. In response to receiving the encrypted one-time password, the application on the user device 514 may use the shared secret to decrypt the encrypted one-time password to obtain the one-time password 516. Similar to the process described above, the application may cause the user's device 514 to display the one-time password 516 or may transmit the one-time password 516 to the computer-implemented service for authentication. Thus, the user may input the one-time password 516 into the one-time password input field 510 or receive an indication from the computer-implemented service through the one-time password input field 510 that the one-time password 516 has been provided. Based at least in part on the credentials provided through the credential input field 508 and the one-time password 516 provided through either the one-time password input field 510 or the application on the user's device 514, the computer-implemented service may determine whether the user can be authenticated and be allowed to access the computer-implemented service.

Figure 6:
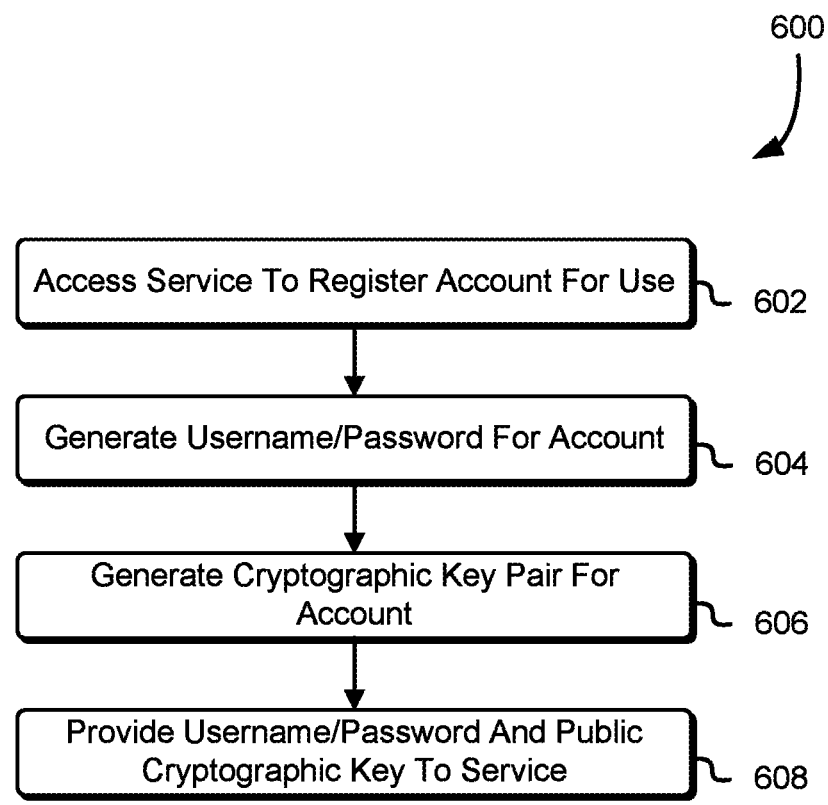
FIG. 6 shows an illustrative example of a process for providing, to a computer-implemented service, a public cryptographic key that can be used to encrypt a one-time password for use in an authentication process in accordance with at least one embodiment.

As noted above, a user of a computer-implemented service may be required, as part of the registration process for the service, to generate a cryptographic key pair from which a public cryptographic key may be provided to the computer-implemented service. This public cryptographic key can be used by the computer-implemented service to encrypt one-time passwords that may be provided to the user for education in response to a user request to access the computer-implemented service. The user may maintain the private cryptographic key of the cryptographic key pair in order to decrypt any data that has been encrypted by the computer-implemented service using the public cryptographic key. Accordingly, FIG. 6 shows an illustrative example of a process 600 for providing, to a computer-implemented service, a public cryptographic key that can be used to encrypt a one-time password for use in an authentication process in accordance with at least one embodiment. The process 600 may be performed by a user client device or other computing device utilized by a user to access a computer-implemented service for registering a user account. The user client device may interact with another user device to generate cryptographic keys, as will be described below.

At any time, a user may utilize a user client to access an application, such as a web browser, to access a user interface of a computer-implemented service to register an account with the computer-implemented service. For instance, a user may enter a URI for the computer-implemented service into the application. This may cause the user client to utilize the URI to access 602 the computer-implemented service through a communications network, such as the Internet, to establish a session with the computer-implemented service that may enable the user to register an account for use with the computer-implemented service. As part of the registration process, the computer-implemented service may update the UI to prompt the user to provide a unique username for the user account and a password or other credentials that may be used to authenticate the user. Thus, through the user client, a user may generate 604 a username for the user account, as well as a password or other credentials that may be used authenticate the user when the user attempts to access the computer-implemented service using the generated username. In some embodiments, the user client may generate the username and corresponding credentials automatically. If so, the user client may provide the generated username and corresponding credentials to the user.

In an embodiment, the computer-implemented service transmits a request to a user device designated by the user, to provide a public cryptographic key that can be used to encrypt one-time passwords. The computer-implemented service may provide an encrypted one-time password to the corresponding user device in response to receiving a username from the user for accessing the computer-implemented service. In response to the request from the computer-implemented service, the user client may invoke an application on the user device to generate 606 a cryptographic key pair for the user account. The public cryptographic key generated by the user device may be used by the computer-implemented service two encrypted one-time passwords that may be used for authentication of the user. The private cryptographic key may be maintained by the user device and may be used to decrypt incoming encrypted one-time passwords from the computer-implemented service.

The user client may provide 608 the username, password or other credentials, and cause the user client to provide the public cryptographic key of the cryptographic key pair to the computer-implemented service to complete the registration process. The computer-implemented service may store the public cryptographic key within a public key datastore and may associate the public cryptographic key with the user account. For example, the computer-implemented service may update a database of the datastore to indicate that the public cryptographic key corresponds to a particular username or other characteristics of the user account (e.g., user contact information, user address, etc.). Further, the computer-implemented service may use the username and password or other credentials to create a user profile for the user. Thus, the user may utilize the username and password or other credentials, along with the one-time password provided by the computer-implemented service to access the computer-implemented service.

Figure 7:
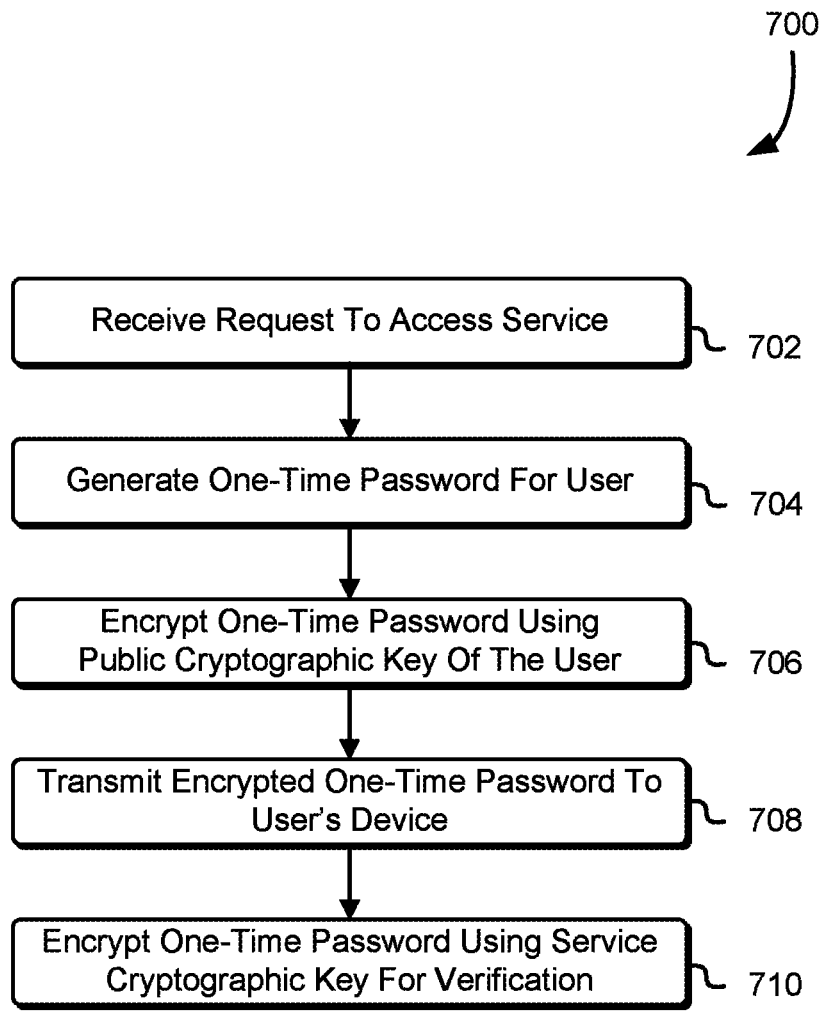
FIG. 7 shows an illustrative example of a process for using a client's public cryptographic key to being hurt generated one-time password for use in authenticating the user in accordance with at least one embodiment.

As noted above, a computer-implemented service, in response to a request from a user to access the computer-implemented service, may generate a one-time password and use the user's public cryptographic key to encrypt the one-time password. The computer-implemented service may provide this encrypted one-time password to the user. The user may be required to utilize its private cryptographic key to decrypt the encrypted one-time password and to provide the decrypted one-time password to the computer-implemented service for authentication. The computer-implemented service may evaluate the one-time password from the user to determine whether it is valid. If it is and other credentials provided by the user are also valid, the computer-implemented service may allow the user to access the computer-implemented service. Accordingly, FIG. 7 shows an illustrative example of a process 700 for using a client's public cryptographic key to being hurt generated one-time password for use in authenticating the client in accordance with at least one embodiment. The process 700 may be performed by a computer-implemented service that may store public cryptographic keys for users of the computer-implemented service and that may use these keys to encrypt one-time passwords that may be provided to these users for authentication.

A user of the computer-implemented service may utilize a user client device or other user device to access a UI of the computer-implemented service to request access to the computer-implemented service and any resources provided by the computer-implemented service. The computer-implemented service may receive 702 the request to access the service from the user and may update the UI to prompt the user to provide a username for a user account maintained by the computer-implemented service. In some embodiments, the computer-implemented service identifies the user based at least in part on an IP address of the user client or user device used to access the UI. Alternatively, a user client may provide a cookie that specifies user information such as a username, contact information for the user, timestamp for the most recent access by the user, and the like.

The computer-implemented service, in response to receiving a username for the user or other information that may be used to identify the user, may update the UI to prompt the user to provide a one-time password that can be used for authentication, as well as any other credentials that can be used to authenticate the user. Further, the computer-implemented service may generate 704 a random one-time password for the user. The random one-time password may be subject to an expiration period where the user may be required to provide the one-time password before the expiration period. After the expiration period, the one-time password may no longer be valid. Further, the one-time password, as the name implies, may only be used once. Thus, if the one-time password is used by the user and it is determined to be valid, the computer-implemented service may discard the random one-time password to prevent further use.

As described above, a user may be required to provide a public cryptographic key to the computer-implemented service as part of a registration process for a user account for the computer-implemented service. The user may retain the private cryptographic key of the cryptographic key pair to decrypt any data from the computer-implemented service that has been encrypted using the public cryptographic key. In an embodiment, the computer-implemented service identifies, based at least in part on the user information provided by the user or the user client device and information specified within the user account or profile, the public cryptographic key of the user. The computer-implemented service may encrypt 706 the one-time password by using the public cryptographic key of the user. The computer-implemented service may transmit 708 this encrypted one-time password to a user device that has been identified as having the private cryptographic key necessary to decrypt the encrypted one-time password. Information regarding the user device may be stored within the user's profile and may be provided by the user as part of the registration process. Encrypted one-time password may be sent to the user device using a text message, an SMS message, or any other kind of message that can be processed by the user's device.

In addition to providing the encrypted one-time password to the user's device, the computer-implemented service may encrypt 710 the random one-time password using its own service cryptographic key or other encryption method to generate a second encrypted one-time password. This second encrypted one-time password is maintained by the computer-implemented service for verification purposes. For instance, in response to receiving the one-time password from the user's device or from a user client, the computer-implemented service may decrypt the second encrypted one-time password using its own cryptographic key or other decryption method to obtain the expected one-time password. The computer-implemented service may compare the one-time password provided by the user to the expected one-time password to determine whether they match. If they match, and the user's other credentials are valid, the computer-implemented service may allow the user to access the computer-implemented service.

Figure 8:
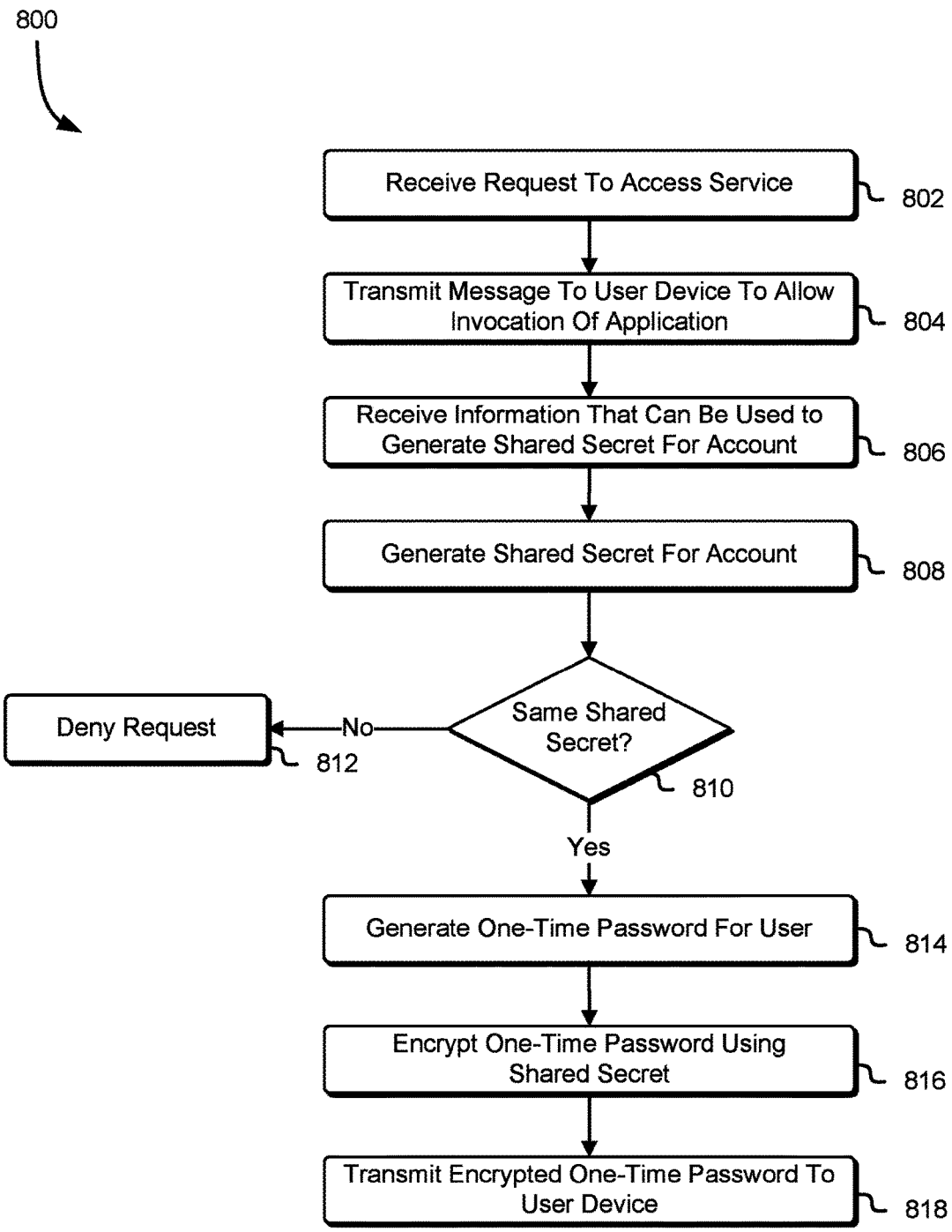
FIG. 8 shows an illustrative example of a process for establishing a shared secret between a user and the computer-implemented service for use in encrypting a one-time password for use in authenticating the client in accordance with at least one embodiment.

As noted above, a computer-implemented service may utilize a shared secret between the computer-implemented service and a user to encrypt a one-time password that is sent to the user for authentication purposes. The shared secret may be created using a PAKE protocol such as SRP. To generate the shared secret, the computer-implemented service and an application installed on the user's device may perform password verification for the user's account. Further, the computer-implemented service may determine whether the shared secret generated by the user matches the shared secret generated by the computer-implemented service. If they match, the computer-implemented service may use the shared secret to encrypt the random one-time password that can be sent to the user as part of an authentication process. Accordingly, FIG. 8 shows an illustrative example of a process 800 for establishing a shared secret between a client and the computer-implemented service for use in encrypting a one-time password for use in authenticating the client in accordance with at least one embodiment. The process 800 may be performed by a computer-implemented service that interacts with a user client and other devices utilized by the user through a PAKE protocol, such as SRP.

Similar to the process 700 described above, the computer-implemented service may receive 802 a request from a user, through a client device or other device of the user, to access the computer-implemented service. For instance, a user of the computer-implemented service may utilize a client device or other user device to access a UI of the computer-implemented service to request access to the computer-implemented service and any resources provided by the computer-implemented service. The computer-implemented service may update the UI to prompt the user to provide a username or may identify the user based at least in part on an IP address of the user client or user device used to access the UI. Alternatively, a user client may provide a cookie that specifies user information such as a username, contact information for the user, timestamp for the most recent access by the user, and the like.

The computer-implemented service may update the UI to allow the user, through a user client or other device, to provide a one-time password that may be provided by the computer-implemented service for authentication. Additionally, the computer-implemented service may transmit 804 a message to a user device designated by the user in the user profile. This message may allow the invocation of an application on the device that enables communication between the device and the computer-implemented service using a PAKE protocol. The application may prompt the user to provide its password for accessing the service. Using the password, the application may generate information associated with a user that can be used to generate a shared secret that may be provided to the computer-implemented service, along with a salt can be used negotiate a shared secret between the application and computer-implemented service. Thus, the computer-implemented service may receive 806 information associated with the user that can be used to generate a shared secret from the user through the application on the user device. The computer-implemented service may utilize a password verifier to determine whether the received information corresponds to the password of the user. If so, the computer-implemented service determines that the application has access to the user's password.

Using information from the application and information from the computer-implemented service, exchanged between the application and the computer-implemented service, the application and the authentication sub-system may generate 808 a shared secret for the user account. The computer-implemented service may determine 810 whether its shared secret, generated using information from the user for the account, matches the shared secret generated by the application on the user device. To prove that the application has the same shared secret as the computer-implemented service, the application may hash the shared secret together with other values known by the computer-implemented service. The application provides this hash to the computer-implemented service for verification. In response, the computer-implemented service may calculate its own hash from the same values and the shared secret that it derived. If these hashes match, the computer-implemented service may determine that the application has access to the correct password or credential and, thus, the application maintains the same shared secret as the computer-implemented service. However, if the application does not have the same shared secret as the computer-implemented service, the computer-implemented service may deny 812 the user's request to access the computer-implemented service.

If the computer-implemented service and the application on the user's device have the same shared secret, the computer-implemented service may generate 814 a random one-time password for the user. The random one-time password may be subject to an expiration period where the user may be required to provide the one-time password before the expiration period. After the expiration period, the one-time password may no longer be valid. Further, the one-time password, as the name implies, may only be used once. Thus, if the one-time password is used by the user and it is determined to be valid, the computer-implemented service may discard the random one-time password to prevent further use.

The computer-implemented service may encrypt 816 the one-time password by using the shared secret that it has generated and is shared with the user. The computer-implemented service may transmit 818 this encrypted one-time password to a user's device that has been identified as having shared secret necessary to decrypt the encrypted one-time password. Information regarding the user device may be stored within the user's profile and may be provided by the user as part of the registration process. Encrypted one-time password may be sent to the user device using a text message, an SMS message, or any other kind of message that can be processed by the user's device. Similar to the process 700 described above, the computer-implemented service may encrypt the random one-time password using its own service cryptographic key or other encryption method to generate a second encrypted one-time password. This second encrypted one-time password is maintained by the computer-implemented service to compare the one-time password provided by the user to the expected one-time password to determine whether they match. If they match, and the user's other credentials are valid, the computer-implemented service may allow the user to access the computer-implemented service. For instance, the computer-implemented service may transmit a notification to a computing server that grants access to the service to indicate that access should be granted to the user. Alternatively, the computer-implemented service itself may grant access to the service to the user. In some embodiments, the computer-implemented service provides a token to the user that the user may utilize to access the service such that, in response to future requests, if the user provides the token, the user may not be required to go through the authentication process described above.

As noted above, a computer-implemented service may utilize one-time passwords for authentication of users requesting access to the computer-implemented service. The computer-implemented service may generate a one-time password in response to a user request to access the computer-implemented service. The computer-implemented service may encrypt this one-time password using the user's own public cryptographic key or a shared secret maintained between the user and the computer-implemented service. If the user provides the valid one-time password, along with other credentials and passwords, to the computer-implemented service, the computer-implemented service may allow the user to access the computer-implemented service.

Figure 9:
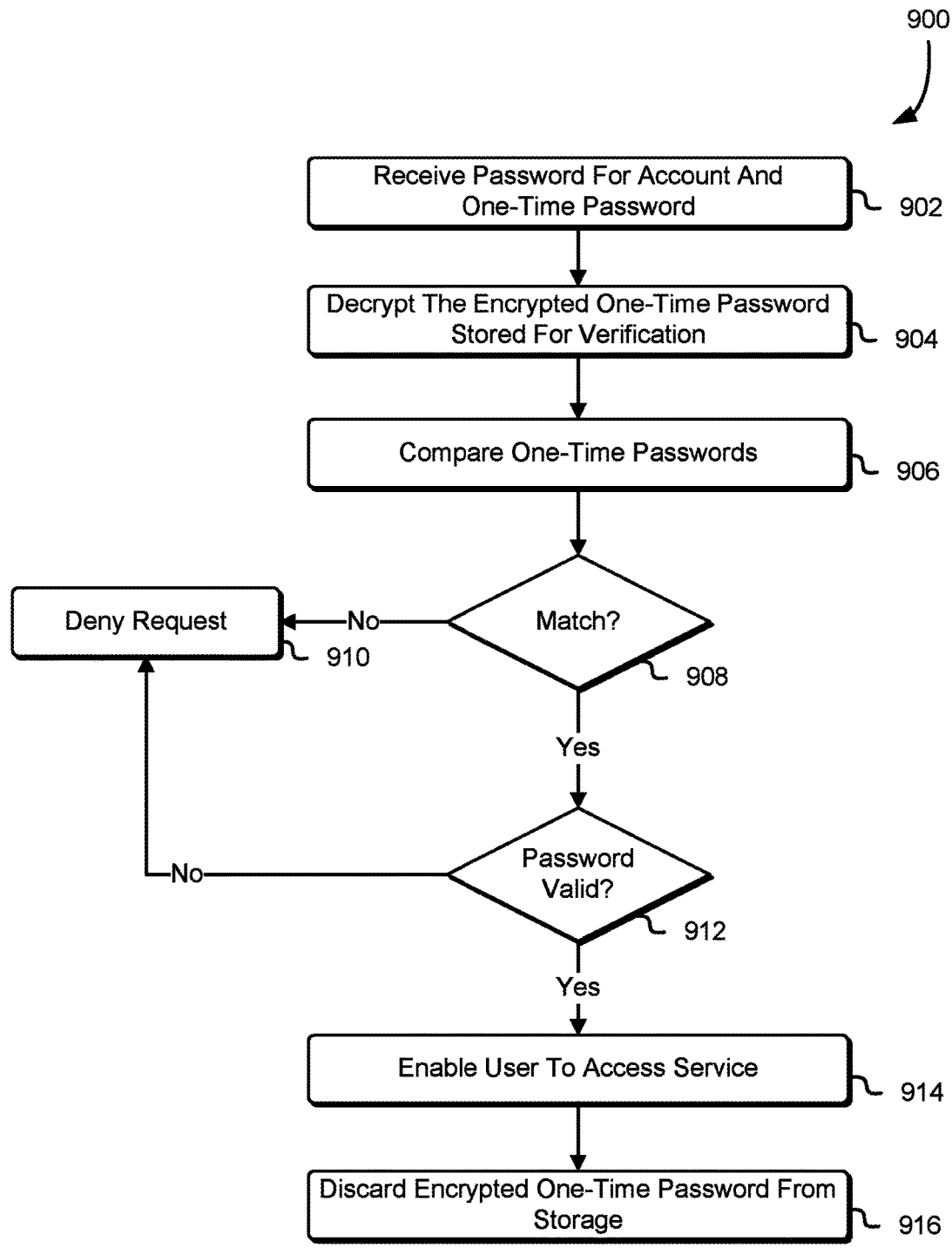
FIG. 9 shows an illustrative example of a process for authenticating a user based at least in part on a provided one-time password and an alternative password in accordance with at least one embodiment.

Otherwise, the computer-implemented service may deny the user's request. Accordingly, FIG. 9 shows an illustrative example of a process 900 for authenticating a user based at least in part on a provided one-time password and an alternative password in accordance with at least one embodiment. The process 900 may be performed by a computer-implemented service, which may generate one-time passwords for users in response to requests to access the service. Further, the computer-implemented service may utilize one or more encryption methods to encrypt the one-time password prior to delivery to the user for use in an authentication process.

In an embodiment, in response to a user request to access the computer-implemented service, the computer-implemented service updates a UI for computer-implemented service to prompt the user to provide its username. If the user provides its username, the computer-implemented service may update the UI to prompt the user to provide its one or more credentials and a one-time password provided by the computer-implemented service as part of the authentication process. The methods used by the computer-implemented service to generate the one-time password that is provided to the user are described above in connection with FIGS. 7 and 8. Through the UI, the computer-implemented service may receive 902 one or more credentials (e.g., passwords) of the user, as well as a one-time password that may have been provided by the computer-implemented service in encrypted form.

In response to receiving the one-time password and the one or more other credentials from the user, the computer-implemented service may decrypt 904 the encrypted one-time password stored by the computer-implemented service for verification purposes. As described above, in addition to providing a one-time password that has been encrypted using either the public cryptographic key of the user or the shared secret to the user, the computer-implemented service may utilize its own cryptographic key or other encryption method to encrypt its own copy of the one-time password. This copy of the one-time password is stored within a database of the computer-implemented service and is made unavailable to any external entities. In response to obtaining the one-time password from the user, the computer-implemented service may utilize its cryptographic key or other decryption method to decrypt its own encrypted one-time password.

The computer-implemented service may compare 906 the one-time password provided by the user and the decrypted one-time password maintained by the computer-implemented service to determine 908 whether the one-time passwords match. If the one-time passwords do not match, the computer-implemented service may determine that the user cannot be authenticated. Thus, the computer-implemented service may deny 910 the user's request to access the computer-implemented service. However, if the computer-implemented service determines that the one-time passwords match, the computer-implemented service may determine 912 whether the provided credentials are valid. For instance, the computer-implemented service may access the user's account to identify the existing credentials for the account. The computer-implemented service may compare the received credentials to those specified in the user account and determine whether they match. If they match, then the credentials may be deemed valid. However, if the credentials do not match or the computer-implemented service otherwise determines that the credentials provided by the user are not valid, the computer-implemented service may deny 910 the request from the user to access the service.

If the one or more credentials provided by the user are valid and the one-time passwords match, the computer-implemented service may enable 914 the user to access the service through use of the user's client device or other device used to access the UI of the computer-implemented service. It should be noted that validation of the user's one-time password and the other credentials provided by the user may be performed in any order or concurrently. For instance, the computer-implemented service may determine whether the provided credentials are valid prior to evaluating the one-time passwords as part of the authentication process.

The computer-implemented service may also discard 916 the encrypted one-time password from storage. This may prevent further use of the one-time password. For instance, if the user provides the same one-time password at a later time, the computer-implemented service may determine that the provided one-time password has expired and is no longer valid, resulting in the computer-implemented service denying the user's request to access the service.

Figure 10:
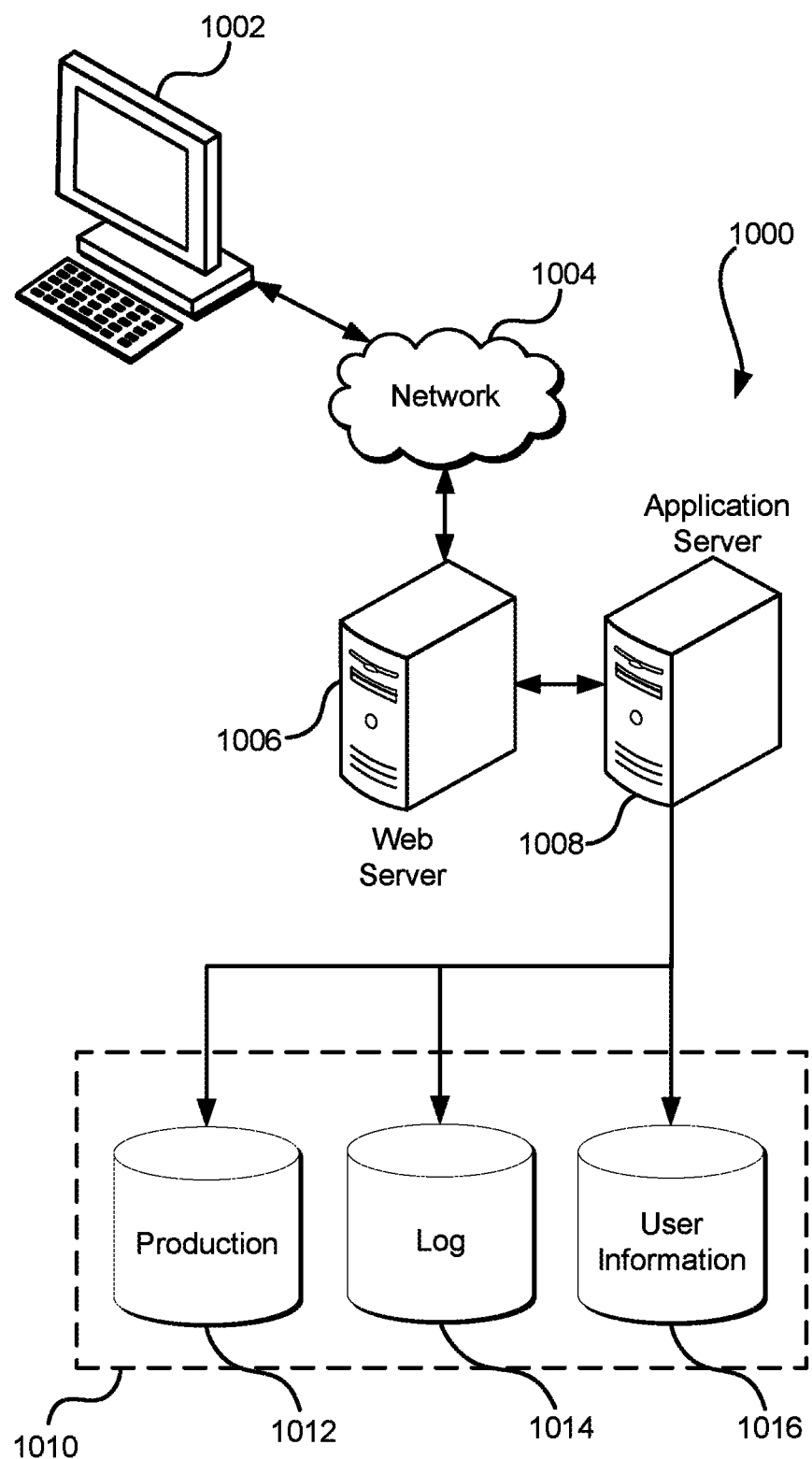
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a first user device and by a server, a request to access a computer-implemented service;
    transmitting, by the server, a notification to a second user device to cause the second user device to invoke an application to establish an authenticated communication with the computer-implemented service using a password authenticated key exchange protocol;
    obtaining, from the second user device and by the server, information associated with a user usable to generate a shared secret with the application, the information generated using credential information of the second user device;
    generating, by the server and through use of the information from the second user device, the shared secret;
    obtaining, from the second user device and by the server through the authenticated communication using the password authenticated key exchange protocol, a hash of a second shared secret, the second shared secret generated by the application;
    determining, by the server, whether the shared secret and the second shared secret match; and
    as a result of the shared secret matching the second shared secret:
        generating, by the server, a one-time password for authentication of the user;
        utilizing, by the server, the shared secret to encrypt the one-time password resulting in an encrypted one-time password;
        transmitting, by the server, the encrypted one-time password to the second user device to enable the second user device to utilize the second shared secret to decrypt the encrypted one-time password;
        obtaining, from the first user device and by the server, a decrypted one-time password;
        comparing, by the server, the decrypted one-time password to the one-time password to determine whether the decrypted one-time password and the one-time password match; and
        as a result of the decrypted one-time password matching the one-time password, allowing the first user device to access the computer-implemented service.

2. The computer-implemented method of claim 1, wherein the method further comprises updating, in response to the request to access the computer-implemented service, a user interface to enable the first user device to provide the decrypted one-time password for authentication.

3. The computer-implemented method of claim 1, wherein the method further comprises:
    using a cryptographic key to encrypt the one-time password resulting in a second encrypted one-time password, the second encrypted one-time password unavailable to the user, the first user device, or the second user device; and
    decrypting, by using the cryptographic key, the second encrypted one-time password to obtain the one-time password in response to obtaining the decrypted one-time password from the first user device.

4. The computer-implemented method of claim 1, wherein the password authenticated key exchange protocol is a Secure Remote Password protocol.

5. A system, comprising:
    one or more processors; and
    memory including instructions that, as a result of execution by the one or more processors, cause the system to:
        utilize information generated using credential information of a first client to generate a first shared secret, the information being associated with the first client;
        obtain, from a second client and through an authenticated communication with the second client using a password authenticated key exchange protocol, a claim of access to a second shared secret generated by the second client;
        determine whether the first shared secret and the second shared secret match; and
        as a result of the first shared secret matching the second shared secret:
            utilize the first shared secret to encrypt a one-time password to create an encrypted one-time password;
            provide the encrypted one-time password to the second client to cause the second client to decrypt the one-time password and make available a decrypted one-time password to the first client;
            obtain, from the first client, a claim of access to the one-time password;
            determine whether the claim of access to the one-time password indicates access to the one-time password; and
            allow the first client access to a computer-implemented service as a result of the claim of access to the one-time password indicating access to the one-time password.

6. The system of claim 5, wherein the instructions further cause the computer system to:
    obtain, from the first client, a request to access the computer-implemented service; and
    in response to the request, transmit a notification to the second client to cause the first client to generate the second shared secret.

7. The system of claim 5, wherein:
    the claim of access to the second shared secret is a hash of the second shared secret; and
    the instructions further cause the system to:
        compute a hash of the first shared secret; and
        compare the hash of the first shared secret and the hash of the second shared secret to determine whether the first shared secret and the second shared secret match.

8. The system of claim 5, wherein:
    the claim of access to the one-time password includes the decrypted one-time password; and
    the instructions further cause the system to compare the decrypted one-time password to the one-time password to determine whether the claim of access to the one-time password indicates access to the one-time password.

9. The system of claim 5, wherein the instructions further cause the system to deny the first client access to the computer-implemented service as a result of the claim of access to the one-time password failing to indicate access to the one-time password.

10. The system of claim 5, wherein the instructions further cause the system to:

utilize a cryptographic key to encrypt the one-time password to create a second encrypted one-time password;

store the second encrypted one-time password in a database that is inaccessible to the first client and the second client; and use the cryptographic key to decrypt the second encrypted one-time password in response to obtaining the claim of access to the one-time password from the first client.

11. The system of claim 5, wherein the instructions further cause the system to generate the one-time password as a result of determining that the first shared secret and the second shared secret match.

12. The system of claim 5, wherein the decrypted one-time password is made available to the first client by the second client using a Near Field Communication protocol.

13. A non-transitory computer-readable storage medium storing thereon executable instructions that, as a result of being executed by one or more processors of a computer system, cause the computer system to at least:

obtain, from a first client, information generated using credential information of a second client;

generate, using the information from the first client, a first shared secret;

obtain, from the first client and through an authentication communication with the first client using a password authenticated key exchange protocol, a claim of access to a second shared secret;

determine whether the first shared secret and the second shared secret match; and as a result of the first shared secret matching the second shared secret:
  encrypt the one-time password using the first shared secret to create an encrypted one-time password;
  provide the encrypted one-time password to the first client to cause the first client to decrypt the one-time password and make available a decrypted one-time password to the second client;
  obtain, from the second client, a claim of access to the one-time password;
  determine whether the claim of access to the one-time password indicates access to the one-time password; and
  as a result of the claim of access to the one-time password indicating access to the one-time password, allow the second client to access a computer-implemented service.

14. The non-transitory computer-readable storage medium of claim 13, wherein the instructions further cause the computer system to transmit, in response to a request from the second client to access the computer-implemented service, a notification to the first client to cause invocation of an application on the first client to establish a shared secret using the password authenticated key exchange protocol.

15. The non-transitory computer-readable storage medium of claim 13, wherein the instructions further cause the computer system to:

use a cryptographic key to encrypt the one-time password resulting in a second encrypted one-time password, the second cryptographic key maintained such that the cryptographic key is inaccessible to the first client and the second client; and decrypt, using the cryptographic key, the second encrypted one-time password in response to obtaining the claim of access to the one-time password.

16. The non-transitory computer-readable storage medium of claim 13, wherein:

the claim of access to the second shared secret is a hash of the second shared secret; and the instructions further cause the system to compare a hash of the first shared secret and the hash of the second shared secret to determine whether the first shared secret and the second shared secret match.

17. The non-transitory computer-readable storage medium of claim 13, wherein the instructions further cause the computer system to deny authentication of the second client as a result of the claim of access to the one-time password failing to indicate access to the one-time password.

18. The non-transitory computer-readable storage medium of claim 13, wherein the instructions further cause the computer system to deny authentication of the second client as a result of the first shared secret failing to match the second shared secret.

19. The non-transitory computer-readable storage medium of claim 13, wherein:

the claim of access to the one-time password includes the decrypted one-time password; and the one or more instructions further cause the computer system to compare the decrypted one-time password to the one-time password to determine whether the claim of access to the one-time password indicates access to the one-time password.

20. The non-transitory computer-readable storage medium of claim 13, wherein the decrypted one-time password is made available to the second client by the first client over a Universal Serial Bus connection between the first client and the second client.

* * * * *